US011696275B2

(12) United States Patent
Wang et al.

(10) Patent No.: US 11,696,275 B2
(45) Date of Patent: Jul. 4, 2023

(54) SPATIAL ASSUMPTION CONFIGURATION FOR NEW RADIO (NR) DOWNLINK TRANSMISSION

(71) Applicant: Apple Inc., Cupertino, CA (US)

(72) Inventors: Guotong Wang, Beijing (CN); Yushu Zhang, Beijing (CN); Gang Xiong, Portland, OR (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 17/269,307

(22) PCT Filed: Sep. 24, 2019

(86) PCT No.: PCT/US2019/052649
§ 371 (c)(1),
(2) Date: Feb. 18, 2021

(87) PCT Pub. No.: WO2020/068791
PCT Pub. Date: Apr. 2, 2020

(65) Prior Publication Data

US 2021/0212082 A1 Jul. 8, 2021

Related U.S. Application Data

(60) Provisional application No. 62/739,080, filed on Sep. 28, 2018.

(51) Int. Cl.
*H04W 72/12* (2023.01)
*H04W 76/15* (2018.01)
(Continued)

(52) U.S. Cl.
CPC .......... *H04W 72/12* (2013.01); *H04B 7/0695* (2013.01); *H04W 76/15* (2018.02); *H04W 76/18* (2018.02)

(58) Field of Classification Search
CPC ..... H04W 72/12; H04W 76/15; H04W 76/18; H04B 7/0695
See application file for complete search history.

(56) References Cited

U.S. PATENT DOCUMENTS 11,452,011 B2 * 9/2022 Jassal .................... H04W 16/28
2017/0273061 A1 9/2017 Park et al.
(Continued)

OTHER PUBLICATIONS

International Search Report dated Jan. 10, 2020 for International Application No. PCT/US2019/052649.
(Continued)

*Primary Examiner* — Parth Patel
(74) *Attorney, Agent, or Firm* — Eschweiler & Potashnik, LLC

(57) ABSTRACT

Techniques discussed herein can facilitate determination of spatial (and/or beam) assumption(s) for PDSCH (Physical Downlink Shared Channel) transmitted after a BFR (Beam Failure Recovery) request but before TCI (Transmission Configuration Information) reconfiguration. One example embodiment can be an apparatus configured to: generate a BFR request that indicates a new candidate beam; process a CORESET (Control Resource Set)-BFR of a set of configured CORESETs, wherein the CORESET-BFR comprises a response to the BFR request; determine a spatial assumption for a first PDSCH based on the BFR request, wherein the first PDSCH is scheduled by a first CORESET of the set of configured CORESETs, wherein the first CORESET is different than the CORESET-BFR, wherein the first PDSCH is scheduled before a TCI state is one of reconfigured, reactivated, or re-indicated; and process the first PDSCH based on the determined spatial assumption for the first PDSCH.

11 Claims, 5 Drawing Sheets

(51) Int. Cl.
*H04W 76/18* (2018.01)
*H04B 7/06* (2006.01)

(56) References Cited

U.S. PATENT DOCUMENTS

| | | | | |
|---|---|---|---|---|
| 2019/0200248 | A1* | 6/2019 | Basu Mallick | H04B 7/088 |
| 2019/0239212 | A1* | 8/2019 | Wang | H04W 72/0413 |
| 2020/0358582 | A1* | 11/2020 | Takeda | H04B 7/0695 |
| 2020/0374960 | A1* | 11/2020 | Deenoo | H04W 76/19 |
| 2021/0014884 | A1* | 1/2021 | Yang | H04W 24/08 |
| 2021/0058129 | A1* | 2/2021 | Takeda | H04W 36/305 |
| 2021/0058133 | A1* | 2/2021 | Takeda | H04W 72/042 |
| 2021/0058797 | A1* | 2/2021 | Yoshioka | H04W 24/04 |
| 2021/0058998 | A1* | 2/2021 | Yuan | H04W 24/08 |
| 2021/0084507 | A1* | 3/2021 | Takeda | H04W 24/04 |
| 2021/0153074 | A1* | 5/2021 | Yang | H04W 76/18 |
| 2021/0159966 | A1* | 5/2021 | Xi | H04L 5/0023 |
| 2021/0212082 | A1* | 7/2021 | Wang | H04L 5/0053 |
| 2021/0234752 | A1* | 7/2021 | Matsumura | H04B 7/0695 |
| 2021/0297138 | A1* | 9/2021 | Matsumura | H04W 74/0833 |
| 2021/0307076 | A1* | 9/2021 | Matsumura | H04B 7/0695 |
| 2021/0344404 | A1* | 11/2021 | Matsumura | H04L 5/0053 |
| 2021/0351975 | A1* | 11/2021 | Matsumura | H04W 16/28 |
| 2023/0038981 | A1* | 2/2023 | Yang | H04W 72/046 |

OTHER PUBLICATIONS

"Summary of remaining issues on beam failure recovery." Source: Huawei, HiSilicon. Agenda Item: 7.1.2.2.4. 3GPP TSG RAN WG1 Meeting #92bis, Sanya, China, Apr. 16-20, 2018. R1-1803637.

"Summary 2 on Remaing issues on Beam Failure Recovery." Source: MediaTek Inc. Agenda Item: 7.1.2.2.4. 3GPP TSG RAN WG1 Meeting #93, Busan, Korea, May 21-25, 2018. R1-1807796.

"Maintenance for beam management." Source: ZTE. Agenda Item: 7.1.2.3. 3GPP TSG RAN WG1 Meeting #94, Gothenburg, Sweden, Aug. 20-24, 2018. R1-1808196.

"Remaining issues on beam management." Source: NTT DOCOMO. Agenda Item: 7.1.2.3. 3GPP TSG RAN WG1 Meeting #94, Gothenburg, Sweden, Aug. 20-24, 2018. R1-1809138.

EP Supplemental Search Report dated Feb. 18, 2022 in connection with Application No. EP19867975.

Spreadtrum Communications; "Remaining issues on beam failure recovery mechanism"; 3GPP TSG RAN WGI Meeting 91; R1-1719695; Nov. 27, 2017.

NTT Docomo; "Remaining issues on beam recovery"; 3GPP TSG RAN WGI Meeting AH 1801; R1-1800661; Jan. 22, 2018.

Qualcomm Incorporated; "Beam management for NR"; 3GPP TSG RAN WGI Meeting 93; R1-1807341; May 25, 2018.

International Preliminary Report on Patentability dated Mar. 23, 2021 in connection with PCT/US2019/052649.

* cited by examiner

SPATIAL ASSUMPTION CONFIGURATION FOR NEW RADIO (NR) DOWNLINK TRANSMISSION

REFERENCE TO RELATED APPLICATIONS

This application is a National Phase entry application of International Patent Application No. PCT/US2019/052649 filed Sep. 24, 2019, which claims priority to U.S. Provisional Application No. 62/739,080 filed Sep. 28, 2018, entitled "Method for Spatial Assumption Configuration for NR Downlink Transmission" and is hereby incorporated by reference in its entirety.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can facilitate transmit diversity in connection with power saving signals.

Figure 1:
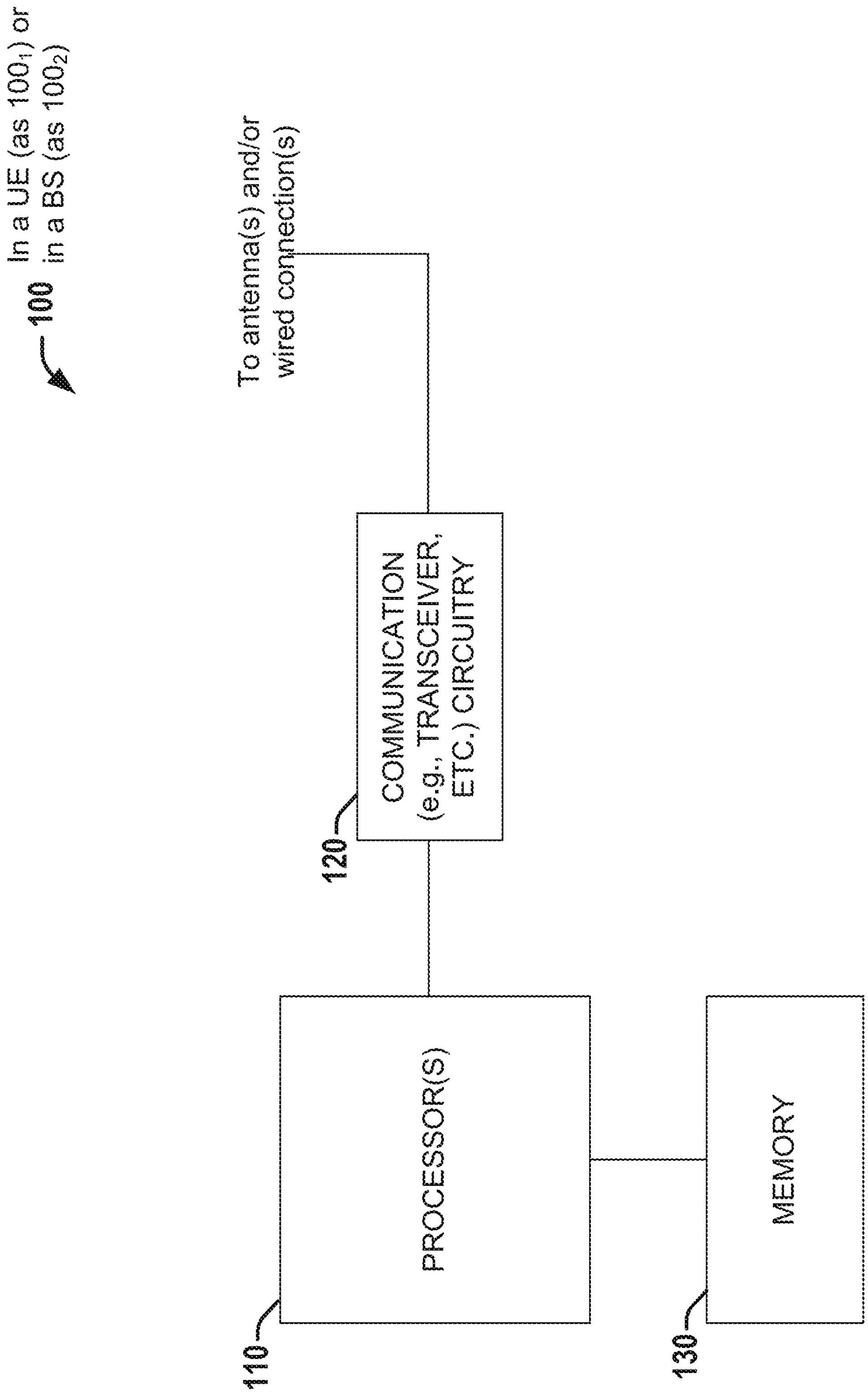
FIG. 1 is a block diagram illustrating a system employable at a UE (User Equipment) or BS (Base Station) that facilitates determining and applying spatial assumptions to PDSCH received during a BFR (Beam Failure Recovery) procedure, according to various aspects described herein.

Referring to FIG. 1, illustrated is a block diagram of a system 100 employable at a UE (User Equipment) (e.g., as system 100$_1$) or a BS (Base Station) (e.g., as system 100$_2$) that facilitates determining and applying spatial assumptions to PDSCH received during a BFR (Beam Failure Recovery) procedure, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). In various aspects, system 100 can be included within a user equipment (UE). In BS aspects, system 100$_2$ can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network, wherein processor(s) 110$_2$, communication circuitry 120$_2$, and memory 130$_2$ can be in a single device or can be included in different devices, such as part of a distributed architecture. In embodiments, signaling from a UE to a BS can be generated by processor(s) 110$_1$, transmitted by communication circuitry 120$_1$, received by communication circuitry 120$_2$, and processed by processor(s) 110$_2$, while signaling from a BS to a UE (e.g., including configuration of a UE) can be generated by processor(s) 110$_2$, transmitted by communication circuitry 120$_2$, received by communication circuitry 120$_1$, and processed by processor(s) 110$_1$.

After beam failure is detected, a UE (e.g., UE 100$_1$) is configured to transmit a beam failure recovery (BFR) request over PRACH (Physical Random Access Channel) and then start to monitor a dedicated PDCCH (Physical Downlink Control Channel) CORESET (Control Resource Set) (CORESET-BFR) and/or dedicated search space (searchspace-BFR) to receive a gNB response to the beam failure recovery request (e.g., from gNB 100$_2$). Consequently, after the gNB response is received by the UE 100$_1$, the PDSCH (Physical Downlink Shared Channel) transmission and reception by the UE 100$_1$ could utilize the beam identified during the PRACH procedure instead of the indicated beam.

However, besides the CORESET-BFR, the UE also monitors all the CORESETs configured before beam failure happens. If DCI (Downlink Control Information) is received over one CORESET other than CORESET-BFR which schedules PDSCH transmission, existing NR systems do not clarify the spatial assumption and/or beam to be used for the PDSCH transmission and reception.

Figure 2:
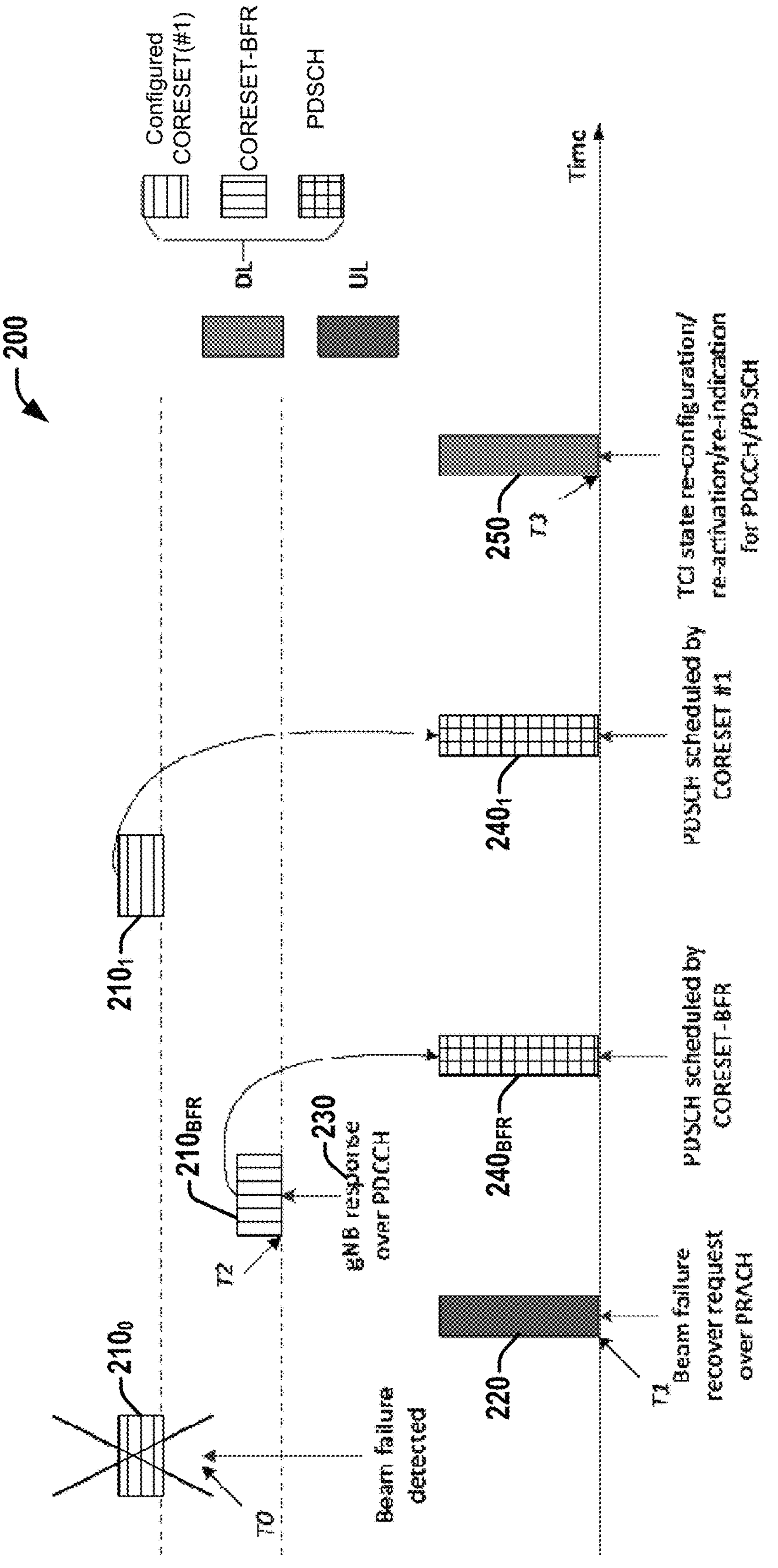
FIG. 2 is a diagram illustrating a first example scenario 200 of downlink transmission during beam failure recovery (BFR) wherein PDSCH (Physical Downlink Shared Channel) is transmitted after the UE receives a BFR response from the gNB, in connection with various aspects discussed herein.
Figure 3:
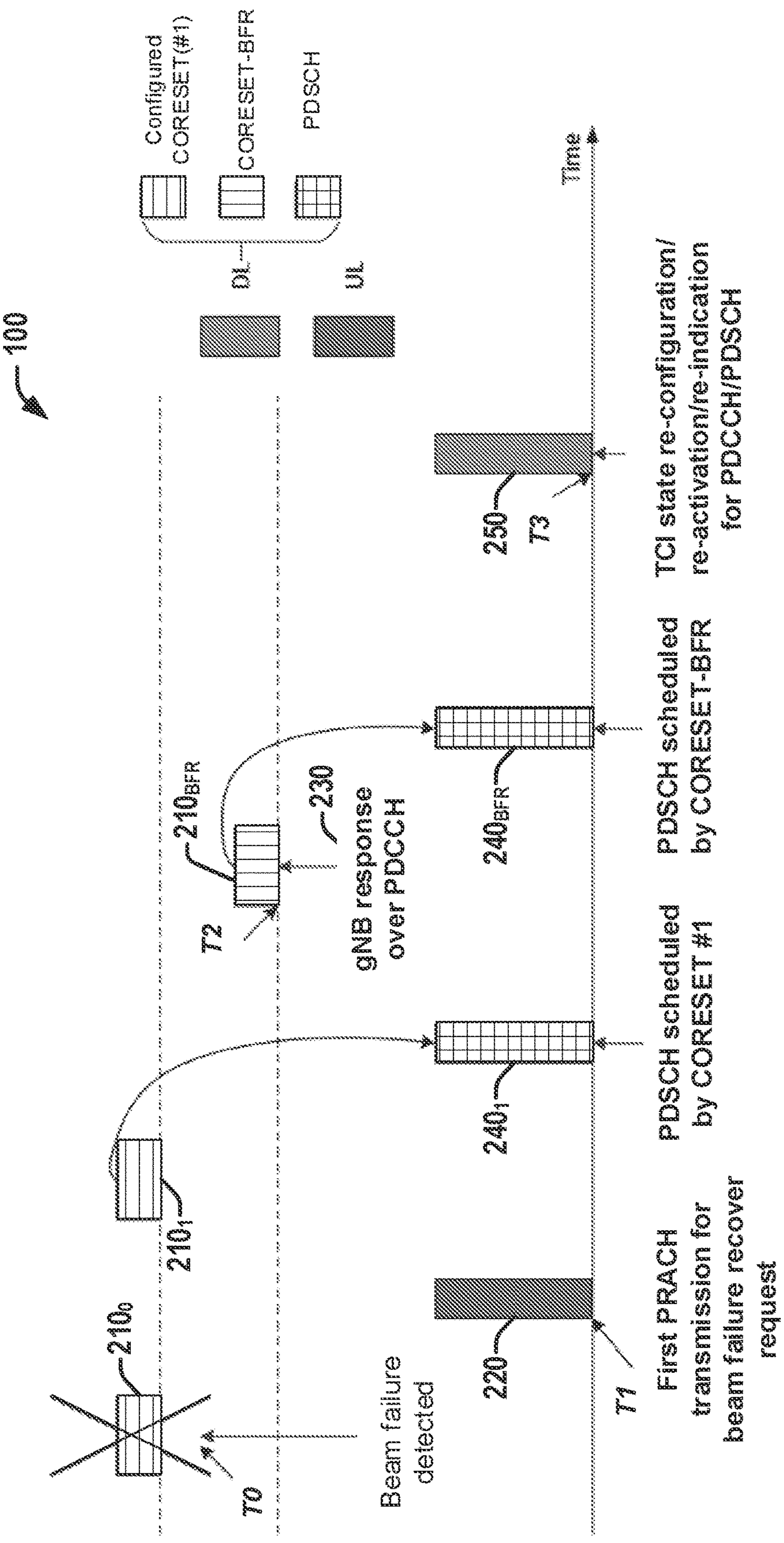
FIG. 3 is a diagram illustrating a second example scenario 300 of downlink transmission during BFR wherein PDSCH is transmitted before the UE receives a BFR response from the gNB, in connection with various aspects discussed herein.

Referring to FIG. 2, illustrated is a diagram showing a first example scenario 200 of downlink transmission during beam failure recovery (BFR) wherein PDSCH (Physical Downlink Shared Channel) is transmitted after the UE receives a BFR response from the gNB, in connection with various aspects discussed herein. Referring to FIG. 3, illustrated is a diagram showing a second example scenario 300 of downlink transmission during BFR wherein PDSCH is transmitted before the UE receives a BFR response from the gNB, in connection with various aspects discussed herein.

Based on some CORESET 2100, beam failure can be detected by UE $\mathbf{100}_1$ (e.g., based on a threshold number of instances (e.g., N, wherein N is a positive integer) of an insufficient beam strength (e.g., as measured by RSRP (Reference Signal Received Power), etc.)). At 220, UE $\mathbf{100}_1$ can generate and transmit a BFR request over PRACH (e.g., identifying a new candidate beam, etc.) at time T1. At time T2, the gNB can generate and transmit a BFR response 230 (e.g., via CORESET-BFR $\mathbf{210}_{BFR}$) over PDCCH, which can also schedule PDSCH $\mathbf{240}_{BFR}$ via CORESET-BFR $\mathbf{210}_{BFR}$. At 250, the TCI (Transmission Configuration Information) can be reconfigured, reactivated, and/or re-indicated for PDCCH/PDSCH at time T3. However, in various scenarios, PDSCH such as PDSCH $\mathbf{240}_1$ can be scheduled by a CORESET $\mathbf{210}_1$ other than CORESET-BFR $\mathbf{210}_{BFR}$ (e.g., CORESET #1 $\mathbf{210}_1$) in the time between BFR request transmission at 220 (at time T1) and subsequent TCI reconfiguration/reactivation/re-indication at 250 (at time T3). Existing NR systems do not address the assumptions that should apply for spatial configuration and/or beams for such PDSCH $\mathbf{240}_1$ (e.g., those received between times T1 and T3), which can be problematic for existing NR systems, given the earlier beam failure detected that has not yet led to TCI reconfiguration/reactivation/re-indication at 250. In some such scenarios (e.g., scenario 200) PDSCH $\mathbf{240}_1$ scheduled by a CORESET $\mathbf{210}_1$ other than CORESET-BFR $\mathbf{210}_{BFR}$ (e.g., CORESET #1 $\mathbf{210}_1$) can be received after the response to the BFR request at 230 (e.g., after time T2), while in other such scenarios (e.g., scenario 300) PDSCH $\mathbf{240}_1$ scheduled by a CORESET $\mathbf{210}_1$ other than CORESET-BFR $\mathbf{210}_{BFR}$ (e.g., CORESET #1 $\mathbf{210}_1$) can be received before the response to the BFR request 230 (e.g., before time T2).

In various embodiments, techniques discussed herein can facilitate beam and/or spatial quasi co-location (QCL) assumption(s) to be used for PDCCH/PDSCH transmission and reception after BFR occurs. Various embodiments can employ techniques to facilitate determining PDSCH spatial (and/or Tx beam) assumption(s) either or both of after (e.g., as in scenario 200) or before (e.g., as in scenario 300) receiving a gNB response 230 to a beam failure recovery request 220 at time T2. A first set of aspects discussed below can be employed by various embodiments to determine spatial and/or beam assumptions for PDSCH transmitted after receiving the gNB response at 230. A second set of aspects discussed below can be employed by various embodiments to determine spatial and/or beam assumptions for PDSCH transmitted before receiving the gNB response at 230.

(1) PDSCH Spatial Assumption (Tx Beam) after Receiving gNB Response for Beam Failure Recovery Request After beam failure is detected (e.g., based on 2100), UE $\mathbf{100}_1$ can transmit a beam failure recovery (BFR) request 220 over PRACH (e.g., which can identify a new candidate beam, etc.) and then start to monitor dedicated PDCCH CORESET (CORESET-BFR $\mathbf{210}_{BFR}$)/dedicated search space (searchspace-BFR) to receive the gNode B (gNB) response 230 to the beam failure recovery request 220. Consequently, after the gNB response 230 is received, the PDSCH transmission (e.g., $\mathbf{240}_{BFR}$, etc.) by gNB $\mathbf{100}_2$ and reception by UE $\mathbf{100}_1$ can utilize the beam identified during the PRACH procedure instead of the indicated beam.

However, besides the CORESET-BFR $\mathbf{210}_{BFR}$, the UE $\mathbf{100}_1$ can also attempt monitoring of all the CORESETs $\mathbf{210}_1$ (e.g., $\mathbf{210}_1$, etc.) configured before beam failure happens. The CORESETs $\mathbf{210}_1$ other than CORESET-BFR $\mathbf{210}_{BFR}$ can also schedule PDSCH transmission (e.g., $\mathbf{240}_1$). In such scenarios, various embodiments can clarify the spatial (QCL) assumption/Tx beam to be used for such PDSCH (e.g., $\mathbf{240}_1$).

In a first set of embodiments of the first set of aspects, after receiving gNB response 230 to the beam failure recovery request 220 over CORESET-BFR $\mathbf{210}_{BFR}$ (at time T2), all the PDSCH transmissions $\mathbf{240}_1$ use the same beam as the identified new beam during the PRACH procedure (e.g., at 220) until the TCI (Transmission Configuration Information) state is re-configured/re-activated/re-indicated at 250 (at time T3). Thus, in such embodiments, for the time between T2 and T3, for all PDSCH transmissions $\mathbf{240}_1$, the UE $\mathbf{100}_1$ can assume the DMRS of PDSCH (e.g., PDSCH $\mathbf{240}_1$) is spatially QCLed with the identified new beam during the PRACH procedure delivering the beam failure recovery request 220, regardless of whether the PDSCH $\mathbf{240}_1$ is scheduled by the CORESET-BFR $\mathbf{210}_{BFR}$ or other monitored CORESET(s) $\mathbf{210}_1$ (previously configured CORESETs, e.g., $\mathbf{210}_1$), and regardless of whether the scheduling offset between PDSCH $\mathbf{240}_1$ and the CORESET $\mathbf{210}_1$ is larger than or smaller than a certain threshold. Additionally, in such embodiments, if the UE is indicated with a TCI state by any CORESET $\mathbf{210}_1$ (e.g., via $\mathbf{210}_1$, etc.) other than the CORESET-BFR $\mathbf{210}_{BFR}$, the UE $\mathbf{100}_1$ can ignore the indicated TCI state.

Alternatively, in other such embodiments, UE $\mathbf{100}_1$ and gNB $\mathbf{100}_2$ can start applying the new identified beam for PDSCH transmissions $\mathbf{240}_1$ that occur after the beam failure recovery request is received by the gNode B $\mathbf{100}_2$ (e.g., as determined by the UE $\mathbf{100}_1$ via reception of the BFR response 230 at time T2, etc.), but not to PDSCH transmissions $\mathbf{240}_1$ that occur before that time.

In some such embodiments, after receiving the beam failure recovery request 220, the gNB $\mathbf{100}_2$ can transmit all the PDSCH $\mathbf{240}_1$ over the identified new beam. In such embodiments, the UE $\mathbf{100}_1$ can assume that all PDSCH transmissions $\mathbf{240}_1$ are over the identified new beam after the UE $\mathbf{100}_1$ starts the first PRACH transmission for beam failure recovery request 220.

In other such embodiments, after the response from gNB $\mathbf{100}_2$ is received by UE $\mathbf{100}_1$ over CORESET-BFR $\mathbf{210}_{BFR}$ at T2, for PDSCH transmission $\mathbf{240}_{BFR}$ scheduled by CORESET-BFR $\mathbf{210}_{BFR}$, spatial and/or beam assumptions can follow the beam used for CORESET-BFR $\mathbf{210}_{BFR}$, that is, the identified new beam during PRACH BFR request 220 until the TCI state is reconfigured/reactivated/re-indicated at 250 at time T3. For PDSCH transmission(s) $\mathbf{240}_1$ between T2 and T3 which are scheduled by CORESET(s) $\mathbf{210}_1$ other than CORESET-BFR $\mathbf{210}_{BFR}$ (e.g., previously configured CORESET(s), such as CORESET $\mathbf{210}_1$), if the scheduling offset between PDSCH (e.g., $\mathbf{240}_1$) and the CORESET (e.g., $\mathbf{210}_1$) is larger than a given threshold (e.g., predefined, configured via higher layer signaling, etc.), then the PDSCH (e.g., $\mathbf{240}_1$) can use the TCI state as indicated. However, if the scheduling offset is smaller than certain threshold, then the PDSCH (e.g., $\mathbf{240}_1$) can apply a default beam, which is the same as the one for the CORESET $\mathbf{210}_1$ with the lowest CORESET ID excluding the CORESET-BFR $\mathbf{210}_{BFR}$. Alternatively, the default PDSCH beam scheduled by CORESET(s) $\mathbf{210}_1$ other than CORESET-BFR $\mathbf{210}_{BFR}$ can the same as the one for CORESET-BFR $210_{BFR}$, which is the identified new beam during the PRACH procedure (e.g., 220, etc.).

In other such embodiments, between times T2 and T3, for PDSCH transmission $240_{BFR}$ scheduled by CORESET-BFR $210_{BFR}$, the scheduling offset can be always larger than a given threshold. The PDSCH $240_1$ scheduled by CORESET(s) $210_1$ other than CORESET-BFR $210_{BFR}$ can be transmitted with a scheduling offset larger than or smaller than the given threshold.

Alternatively, in some such embodiments, between T2 and T3, for any PDSCH transmission $240_1$, no matter whether it is scheduled by CORESET-BFR $210_{BFR}$ or some other CORESET $210_1$, the scheduling offset between PDSCH $240_1$ and the scheduling CORESET $210_1$ can be larger than a given threshold. PDSCH $240_{BFR}$ scheduled by CORESET-BFR $210_{BFR}$ can follow the identified new beam for spatial assumption and beam, while PDSCH $240_1$ scheduled by other CORESET(s) $210_1$ can follow the indicated TCI state.

In another set of embodiments of the first set of aspects, to ensure that both gNB $100_2$ and UE $100_1$ have the same understanding that the BFR response 230 is received successfully, the new beam can be applied to PDSCH transmission(s) $240_1$ X slots after UE $100_1$ reports ACK if CORESET-BFR $210_{BFR}$ is used to schedule that PDSCH transmission $240_1$, or Y slots after UE $100_1$ transmits PUSCH (Physical Uplink Shared Channel) if CORESET-BFR $210_{BFR}$ is used to schedule PUSCH transmission, or Z slots after UE transmits SRS (Sounding Reference Signal) if the PDCCH for BFR response 230 is used to schedule aperiodic SRS transmission, where X, Y and Z can be predefined or configured by higher layer signaling (e.g., RRC (Radio Resource Control), etc.). Before the X/Y/Z slots, the original Tx beam can be applied for PDSCH transmission(s) $240_1$ in such embodiments.

In another set of embodiments of the first set of aspects, after the BFR response 230 is received successfully (e.g., starting from the time discussed in embodiments above), the UE $100_1$ can assume that all the monitoring CORESETs $210_1$ in the active bandwidth part in the current component cell (CC) and PDSCH $240_1$ are QCLed with the new beam applied to the CORESET-BFR $210_{BFR}$ which carries the BFR response 230.

(2) PDSCH Spatial Assumption (Tx Beam) Before Receiving gNB Response for Beam Failure Recovery Request The second set of aspects addresses the spatial (QCL) assumption for PDSCH $240_1$ after beam failure before receiving the gNB response 230 to the beam failure recovery request 220. FIG. 3, discussed above, shows an example scenario wherein PDSCH $240_1$ is received after declaring beam failure (and sending a BFR request 220) but before receiving a response at 230 to the BFR request.

As shown in FIG. 3, after the beam failure recovery request 220 is delivered over PRACH for the first time (at time T1 in FIGS. 2-3), the UE can start to monitor CORESET-BFR $210_{BFR}$. Before gNB response 230 is received (at time T2 in FIGS. 2-3), if DCI is received over another previously configured CORESET(s) $210_1$, then the spatial assumption to apply for the scheduled PDSCH $240_1$ is unclear in existing NR systems. Accordingly, various embodiments can apply spatial/beam assumptions discussed herein for PDSCH $240_1$ scheduled via CORESET(s) $210_1$ other than CORESET-BFR $210_{BFR}$ and received between the BFR request 220 is transmitted at time T1 and the gNB response 230 is received at time T2.

In various embodiments in connection with the second set of aspects, between the time (at time T1) when the first PRACH transmission for beam failure recovery request 220 and when (at time T2) the gNB response 230 is received, for PDSCH transmission(s) $240_1$ scheduled by previously configured CORESET(s) $210_1$, the PDSCH $240_1$ can follow the TCI state as indicated if the scheduling offset is larger than a given threshold. If the scheduling offset is smaller than the given threshold, then the default beam for PDSCH $240_1$ is the same as the CORESET $210_1$ with lowest CORESET ID in the latest slot (which, depending on the embodiments, can be determined from among all CORESETs $210_1$ excluding the CORESET-BFR $210_{BFR}$ or from among all CORESETs $210_1$ including CORESET-BFR $210_{BFR}$). Between T1 and T2, the CORESET-BFR $210_1$ monitoring is the highest priority for the UE $100_1$. If the spatial assumption for other CORESET(s) $210_1$/PDSCH $240_1$ is conflicted with CORESET-BFR $210_{BFR}$, then only the spatial assumption for CORESET-BFR $210_{BFR}$ is kept.

Additional Embodiments

Figure 4:
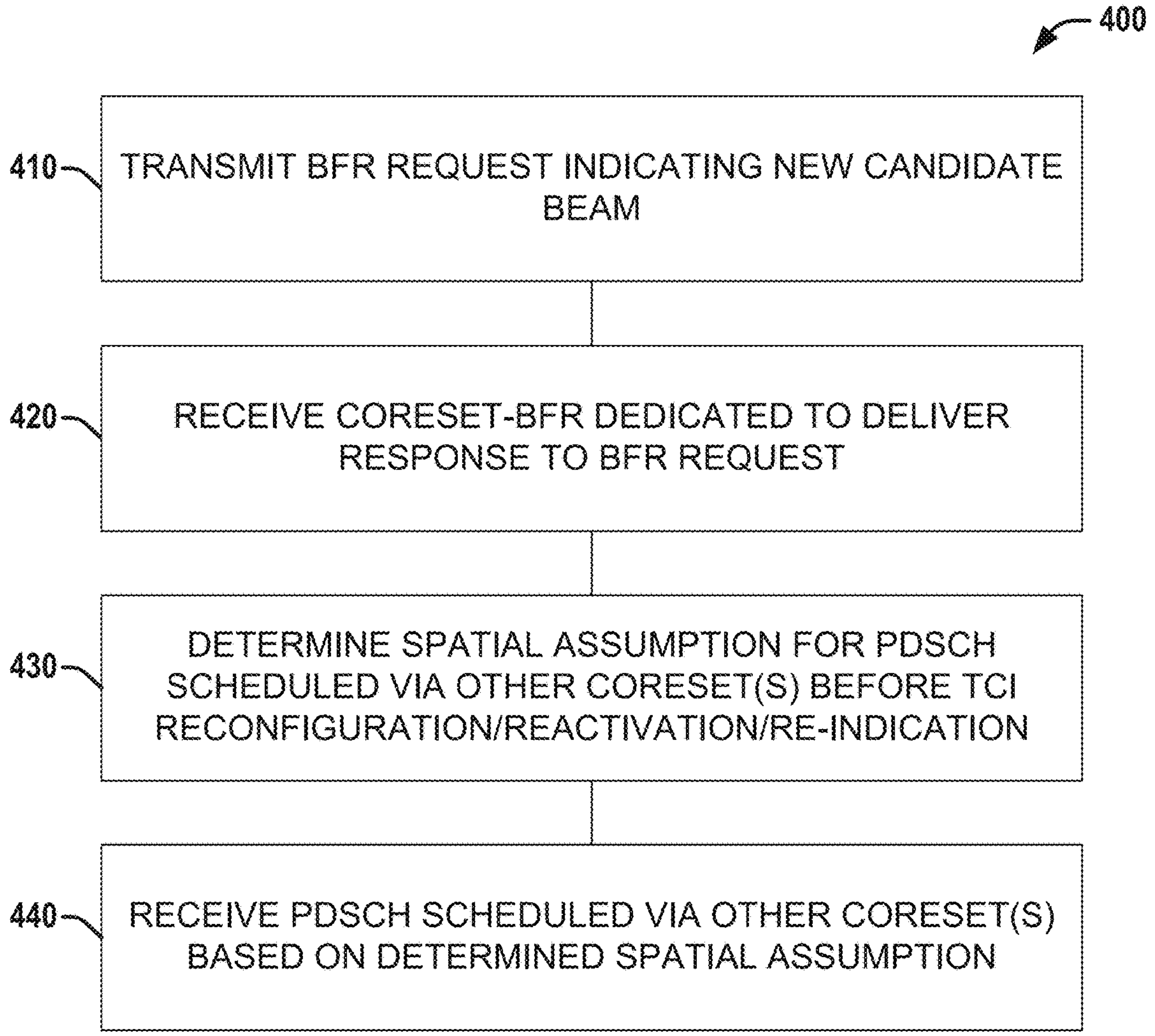
FIG. 4 is a flow diagram illustrating an example method employable at a UE that facilitates applying a set of spatial (e.g., QCL) and/or beam assumptions to PDSCH received after the UE generates a BFR request but before TCI reconfiguration/reactivation/re-indication, according to various aspects discussed herein.

Referring to FIG. 4, illustrated is a flow diagram of an example method 400 employable at a UE (e.g., UE $100_1$) that facilitates applying a set of spatial (e.g., QCL) and/or beam assumptions to PDSCH received after the UE generates a BFR request but before TCI reconfiguration/reactivation/re-indication, according to various aspects discussed herein. In other aspects, a machine readable medium can store instructions associated with method 400 that, when executed, can cause a UE to perform the acts of method 400.

At 410, a BFR request indicating a new candidate beam can be transmitted by a UE and received by a gNB (e.g., following a declared beam failure).

At 420, a CORESET-BFR can be received (by the UE) that is dedicated to deliver a response to the BFR request.

At 430, a spatial assumption can be determined for a PDSCH scheduled by a CORESET other than CORESET-BFR, wherein the PDSCH is scheduled before a TCI reconfiguration/reactivation/re-indication, and either before or after the CORESET-BFR comprising the response to the BFR request. In various embodiments, various techniques discussed can be employed for determining the spatial assumption, which can depend on whether the PDSCH is scheduled before or after the CORESET-BFR comprising the response to the BFR request.

At 440, the PDSCH scheduled by the CORESET other than CORESET-BFR can be received and processed based on the determined spatial assumption.

Additionally or alternatively, method 400 can include one or more other UE acts described herein in connection with PDSCH spatial/beam assumptions to apply before or after receiving a gNB response to a BFR request.

Figure 5:
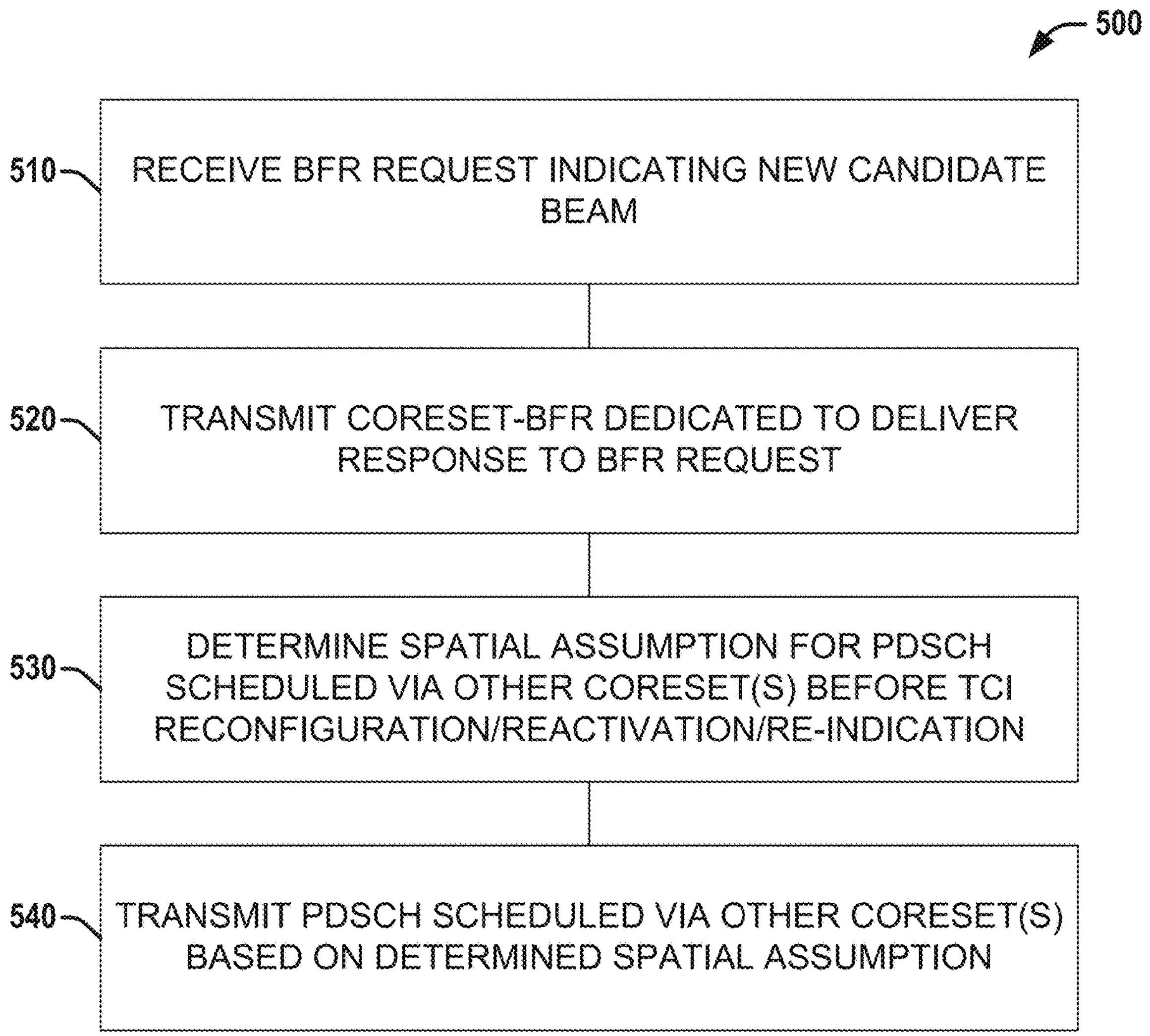
FIG. 5 is a flow diagram illustrating an example method 500 employable at a gNB (e.g., gNB 100$_2$) that facilitates applying a set of spatial (e.g., QCL) and/or beam assumptions to PDSCH received after the UE generates a BFR request but before TCI reconfiguration/reactivation/re-indication, according to various aspects discussed herein.

Referring to FIG. 5, illustrated is a flow diagram of an example method 500 employable at a gNB (e.g., gNB $100_2$) that facilitates applying a set of spatial (e.g., QCL) and/or beam assumptions to PDSCH received after the UE generates a BFR request but before TCI reconfiguration/reactivation/re-indication, according to various aspects discussed herein. In other aspects, a machine readable medium can store instructions associated with method 500 that, when executed, can cause a gNB to perform the acts of method 500.

At 510, a BFR request indicating a new candidate beam can be received (e.g., following a declared beam failure at a UE).

At 520, a CORESET-BFR can be transmitted by the gNB that is dedicated to deliver a response to the BFR request.

At 530, a spatial assumption can be determined for a PDSCH scheduled by a CORESET other than CORESET-BFR, wherein the PDSCH is scheduled before a TCI reconfiguration/reactivation/re-indication, and either before or after the CORESET-BFR comprising the response to the BFR request. In various embodiments, various techniques discussed can be employed for determining the spatial assumption, which can depend on whether the PDSCH is scheduled before or after the CORESET-BFR comprising the response to the BFR request.

At 540, the PDSCH scheduled by the CORESET other than CORESET-BFR can be generated and transmitted based on the determined spatial assumption.

Additionally or alternatively, method 500 can include one or more other gNB acts described herein in connection with PDSCH spatial/beam assumptions to apply before or after receiving a gNB response to a BFR request.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

In a first example embodiment, a User Equipment (UE) (e.g., UE $\mathbf{100}_1$) can perform beam failure detection and send a beam failure recovery request (e.g., 220) to a gNB (e.g., $\mathbf{100}_2$). The beam failure recovery request can be sent over PRACH, and the UE can consequently monitor for a response 230 from the gNode B.

In a second example embodiment, a gNode B (e.g., $\mathbf{100}_2$), after receiving a beam failure recovery request (e.g., 220, which can be generated by the UE of the first example embodiment), the gNB could send response to the UE over dedicated PDCCH CORESET (CORESET-BFR).

A third example embodiment comprises the first example embodiment or the second example embodiment, wherein after receiving gNB response to the beam failure recovery request over CORESET-BFR (at T2), all the PDSCH transmissions use the same beam as the identified new beam during the PRACH procedure until the TCI state is re-configured/re-activated/re-indicted (at T3). Thus, between T2 and T3, for all the PDSCH transmissions, the UE can assume the PDSCH DMRS (Demodulation Reference Signal) is spatially QCLed with the identified new beam during the PRACH procedure delivering the beam failure recovery request (e.g., 220), regardless of whether the PDSCH is scheduled by the CORESET-BFR or other monitored CORESET(s) (previously configured CORESETs), and regardless of whether the scheduling offset between PDSCH and the scheduling CORESET is larger than or smaller than any threshold. If the UE is indicated with a TCI state by any CORESET other than the CORESET-BFR, the TCI state can be ignored by the UE.

A fourth example embodiment can be based on the third example embodiment, wherein alternatively, the starting time point to apply the new identified beam for PDSCH transmission is after the beam failure recovery request is received by the gNode B. From the gNB perspective, after receiving the beam failure recovery request, the gNB can start to transmit all the PDSCH over the identified new beam. From the UE perspective, the UE can assume all the PDSCH transmission is over the identified new beam after the UE starts the first PRACH transmission for beam failure recovery request.

A fifth example embodiment comprises the first example embodiment or the second example embodiment, wherein after the gNB response is received over CORESET-BFR (at T2), PDSCH transmission scheduled by CORESET-BFR can follow the beam used for CORESET-BFR, which is the identified new beam during the PRACH until TCI state is re-configured/re-activated/re-indicted (at T3). For PDSCH transmission between T2 and T3 which is scheduled by CORESET(s) other than CORESET-BFR (previously configured CORESETs), if the scheduling offset between PDSCH and the CORESET is larger than a given threshold, then the PDSCH can use the TCI state as indicated. If the scheduling offset is smaller than the given threshold, then the PDSCH can apply a default beam, which can be the same as the one for the CORESET with the lowest CORESET ID excluding the CORESET-BFR. Alternatively, the default PDSCH beam scheduled by CORESET other than CORESET-BFR can the same as the one for CORESET-BFR, which is the identified new beam during the PRACH procedure.

A sixth example embodiment comprises the first example embodiment or the second example embodiment, wherein, between T2 and T3, for PDSCH transmission scheduled by CORESET-BFR, the scheduling offset can be always larger than a given threshold. The PDSCH scheduled by CORESET(s) other than CORESET-BFR could be transmitted with scheduling offset larger than or smaller than the given threshold.

A seventh example embodiment comprises the first example embodiment or the second example embodiment, wherein, between T2 and T3, for any PDSCH transmission, regardless of whether it is scheduled by CORESET-BFR or not, the scheduling offset between PDSCH and the scheduling CORESET can be larger than a given threshold. For PDSCH scheduled by CORESET-BFR, the spatial assumption can follow the identified new beam. For PDSCH scheduled by other CORESET(s), the spatial assumption can follow the indicated TCI state.

An eighth example embodiment comprises the first example embodiment or the second example embodiment, wherein to ensure that both gNB and UE have the same understanding that the BFR response is received successfully, the new beam can be applied to PDSCH transmission(s) X slots after the UE reports ACK if CORESET-BFR is used to schedule PDSCH transmission, or Y slots after UE transmits PUSCH if CORESET-BFR is used to schedule PUSCH transmission, or Z slots after UE transmits SRS if PDCCH for BFR response is used to schedule aperiodic SRS transmission, where X, Y and Z can be predefined or configured by higher layer signaling. Before the X/Y/Z slots, the original Tx beam is applied for PDSCH transmission.

A ninth example embodiment comprises the first example embodiment or the second example embodiment, wherein after the BFR response is received successfully, the UE can assume that all the monitoring CORESETs in active bandwidth part in current component cell (CC) and PDSCH are QCLed with the new beam applied to the CORESET-BFR which carries BFR response.

A tenth example embodiment comprises the first example embodiment or the second example embodiment, wherein between the first PRACH transmission for beam failure recovery request (T1) and gNB response is received (T2), for PDSCH transmission scheduled by previously configured CORESET(s), the PDSCH can follow the TCI state as indicated if the scheduling offset is larger than a given threshold. If the scheduling offset is smaller than the given threshold, then the default beam for PDSCH is the same as the CORESET with lowest CORESET ID in the latest slot (which can be among all CORESETs excluding the CORESET-BFR or all CORESETs including CORESET-BFR). Between T1 and T2, the CORESET-BFR monitoring is the highest priority; thus, if the spatial assumption for other CORESET(s)/PDSCH is conflicted with CORESET-BFR, then only the spatial assumption for CORESET-BFR is kept.

The following are additional example embodiments.

Example 1 is an apparatus configured to be employed in a UE (User Equipment), comprising: a memory interface; and processing circuitry configured to: generate a beam failure recovery (BFR) request that indicates a new candidate beam; process a CORESET (Control Resource Set)-BFR of a set of configured CORESETs, wherein the CORESET-BFR is dedicated to deliver a response to the BFR request; determine a spatial assumption for a first PDSCH (Physical Downlink Shared Channel) based on the BFR request, wherein the first PDSCH is scheduled by a first CORESET of the set of configured CORESETs, wherein the first CORESET is different than the CORESET-BFR, wherein the first PDSCH is scheduled before a TCI (Transmission Configuration Information) state is one of reconfigured, reactivated, or re-indicated; and process the first PDSCH based on the determined spatial assumption for the first PDSCH.

Example 2 comprises the subject matter of any variation of any of example(s) 1, wherein the first PDSCH is scheduled before the CORESET-BFR delivers the response to the BFR request.

Example 3 comprises the subject matter of any variation of any of example(s) 2, wherein a scheduling offset between the first CORESET and the first PDSCH is greater than a threshold, and wherein the spatial assumption determined for the first PDSCH is based on an indicated TCI state for the first PDSCH.

Example 4 comprises the subject matter of any variation of any of example(s) 2, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

Example 5 comprises the subject matter of any variation of any of example(s) 2, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

Example 6 comprises the subject matter of any variation of any of example(s) 1, wherein the first PDSCH is scheduled after the CORESET-BFR delivers the response to the BFR request.

Example 7 comprises the subject matter of any variation of any of example(s) 6, wherein a scheduling offset between the first CORESET and the first PDSCH is greater than a threshold.

Example 8 comprises the subject matter of any variation of any of example(s) 7, wherein the spatial assumption determined for the first PDSCH is based on an indicated TCI state for the first PDSCH.

Example 9 comprises the subject matter of any variation of any of example(s) 6, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

Example 10 comprises the subject matter of any variation of any of example(s) 6, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

Example 11 comprises the subject matter of any variation of any of example(s) 6, wherein the spatial assumption determined for the first PDSCH is based on the new candidate beam indicated by the BFR request.

Example 12 comprises the subject matter of any variation of any of example(s) 6, wherein the processing circuitry is further configured to generate an ACK (Acknowledgement) for the response to the BFR request, wherein the first PDSCH is scheduled X or more slots after the ACK, wherein X is one of predefined in a specification or configured via higher layer signaling, and wherein the spatial assumption determined for the first PDSCH is based on the new candidate beam indicated by the BFR request.

Example 13 comprises the subject matter of any variation of any of example(s) 6, wherein the processing circuitry is further configured to generate an ACK (Acknowledgement) for the response to the BFR request, wherein the first PDSCH is scheduled less than X slots after the ACK, wherein X is one of predefined in a specification or configured via higher layer signaling, and wherein the spatial assumption determined for the first PDSCH is based on an original beam associated with the first CORESET.

Example 14 comprises the subject matter of any variation of any of example(s) 6-13, wherein the CORESET-BFR schedules a second PDSCH, and wherein the processing circuitry is further configured to: determine a spatial assumption for the second PDSCH based on the new candidate beam indicated by the BFR request; and process the second PDSCH based on the determined spatial assumption for the second PDSCH.

Example 15 is an apparatus configured to be employed in a UE (User Equipment), comprising: a memory interface; and processing circuitry configured to: process a beam failure recovery (BFR) request that indicates a new candidate beam; generate a CORESET (Control Resource Set)-BFR of a set of configured CORESETs, wherein the CORESET-BFR is dedicated to deliver a response to the BFR request; determine a spatial assumption for a first PDSCH (Physical Downlink Shared Channel) based on the BFR request, wherein the first PDSCH is scheduled by a first CORESET of the set of configured CORESETs, wherein the first CORESET is different than the CORESET-BFR, wherein the first PDSCH is scheduled before a TCI (Transmission Configuration Information) state is one of reconfigured, reactivated, or re-indicated; and generate the first PDSCH based on the determined spatial assumption.

Example 16 comprises the subject matter of any variation of any of example(s) 15, wherein a scheduling offset between the first CORESET and the first PDSCH is greater than a threshold, and wherein the spatial assumption determined for the first PDSCH is based on an indicated TCI state for the first PDSCH.

Example 17 comprises the subject matter of any variation of any of example(s) 15, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

Example 18 comprises the subject matter of any variation of any of example(s) 15, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

Example 19 is a machine-readable medium comprising instructions that, when executed, cause a User Equipment (UE) to: generate a beam failure recovery (BFR) request that indicates a new candidate beam; process a CORESET (Control Resource Set)-BFR of a set of configured CORESETs, wherein the CORESET-BFR is dedicated to deliver a response to the BFR request; determine a spatial assumption for a first PDSCH (Physical Downlink Shared Channel) based on the BFR request, wherein the first PDSCH is scheduled by a first CORESET of the set of configured CORESETs, wherein the first CORESET is different than the CORESET-BFR, wherein the first PDSCH is scheduled before a TCI (Transmission Configuration Information) state is one of reconfigured, reactivated, or re-indicated; and process the first PDSCH based on the determined spatial assumption for the first PDSCH.

Example 20 comprises the subject matter of any variation of any of example(s) 19, wherein a scheduling offset between the first CORESET and the first PDSCH is greater than a threshold, and wherein the spatial assumption determined for the first PDSCH is based on an indicated TCI state for the first PDSCH.

Example 21 comprises the subject matter of any variation of any of example(s) 19, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

Example 22 comprises the subject matter of any variation of any of example(s) 19, wherein a scheduling offset between the first CORESET and the first PDSCH is less than a threshold, and wherein the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

Example 23 comprises an apparatus comprising means for executing any of the described operations of examples 1-22.

Example 24 comprises a machine readable medium that stores instructions for execution by a processor to perform any of the described operations of examples 1-22.

Example 25 comprises an apparatus comprising: a memory interface; and processing circuitry configured to: perform any of the described operations of examples 1-22.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus configured to be employed in a UE (User Equipment), comprising:

a memory interface; and processing circuitry configured to:

generate a beam failure recovery (BFR) request that indicates a new candidate beam;

process a CORESET (Control Resource Set)-BFR of a set of configured CORESETs, wherein the CORESET-BFR is dedicated to deliver a response to the BFR request;

generate an ACK (Acknowledgement) for the response to the BFR request;

process scheduling information for a first PDSCH (Physical Downlink Shared Channel) based on the BFR request, wherein the first PDSCH is scheduled by a first CORESET of the set of configured CORESETs, wherein the first CORESET is different than the CORESET-BFR, wherein the first PDSCH is scheduled before a TCI (Transmission Configuration Information) state is one of reconfigured, reactivated, or re-indicated;

determine a spatial assumption for the first PDSCH based on an offset between the ACK and the first PDSCH, wherein when the offset is X or more slots the spatial assumption is based on the new candidate beam and wherein when the offset is less than X slots the spatial assumption for the first PDSCH is based on an original beam associated with the first CORESET, further wherein X is one of predefined in a specification or configured via higher layer signaling; and process the first PDSCH based on the determined spatial assumption for the first PDSCH.

2. The apparatus of claim 1, wherein when a scheduling offset between the first CORESET and the first PDSCH is less than a threshold, the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

3. The apparatus of claim 1, wherein when a scheduling offset between the first CORESET and the first PDSCH is less than a threshold, the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

4. An apparatus configured to be employed in a gNode B, comprising:

a memory interface; and processing circuitry configured to:

process a beam failure recovery (BFR) request that indicates a new candidate beam;

generate a CORESET (Control Resource Set)-BFR of a set of configured CORESETs, wherein the CORESET-BFR is dedicated to deliver a response to the BFR request;

receive an ACK (Acknowledgement) for the response to the BFR request;

generate scheduling information for a first PDSCH (Physical Downlink Shared Channel) based on the BFR request, wherein the first PDSCH is scheduled by a first CORESET of the set of configured CORESETs, wherein the first CORESET is different than the CORESET-BFR, wherein the first PDSCH is scheduled before a TCI (Transmission Configuration Information) state is one of reconfigured, reactivated, or re-indicated;

determine a spatial assumption for the first PDSCH based on an offset between the ACK and the first PDSCH, wherein when the offset is X or more slots the spatial assumption is based on the new candidate beam and wherein when the offset is less than X slots the spatial assumption for the first PDSCH is based on an original beam associated with the first CORESET, further wherein X is one of predefined in a specification or configured via higher layer signaling; and generate the first PDSCH based on the determined spatial assumption.

5. The apparatus of claim 4, wherein when a scheduling offset between the first CORESET and the first PDSCH is greater than a threshold, the spatial assumption determined for the first PDSCH is based on an indicated TCI state for the first PDSCH.

6. The apparatus of claim 4, wherein when a scheduling offset between the first CORESET and the first PDSCH is less than a threshold, the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

7. The apparatus of claim 4, wherein when a scheduling offset between the first CORESET and the first PDSCH is less than a threshold, the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

8. A non-transitory machine-readable medium comprising instructions that, when executed, cause a User Equipment (UE) to:

generate a beam failure recovery (BFR) request that indicates a new candidate beam;

process a CORESET (Control Resource Set)-BFR of a set of configured CORESETs, wherein the CORESET-BFR is dedicated to deliver a response to the BFR request;

generate an ACK (Acknowledgement) for the response to the BFR request;

process scheduling information for a first PDSCH (Physical Downlink Shared Channel) based on the BFR request, wherein the first PDSCH is scheduled by a first CORESET of the set of configured CORESETs, wherein the first CORESET is different than the CORESET-BFR, wherein the first PDSCH is scheduled before a TCI (Transmission Configuration Information) state is one of reconfigured, reactivated, or re-indicated;

determine a spatial assumption for the first PDSCH based on an offset between the ACK and the first PDSCH, wherein when the offset is X or more slots the spatial assumption is based on the new candidate beam and wherein when the offset is less than X slots the spatial assumption for the first PDSCH is based on an original beam associated with the first CORESET, further wherein X is one of predefined in a specification or configured via higher layer signaling; and process the first PDSCH based on the determined spatial assumption for the first PDSCH.

9. The non-transitory machine-readable medium of claim 8, wherein when a scheduling offset between the first CORESET and the first PDSCH is greater than a threshold, the spatial assumption determined for the first PDSCH is based on an indicated TCI state for the first PDSCH.

10. The non-transitory machine-readable medium of claim 8, wherein when a scheduling offset between the first CORESET and the first PDSCH is less than a threshold, the spatial assumption determined for the first PDSCH is based on a default beam that corresponds to a second CORESET of the set of configured CORESETs, wherein the second CORESET has a lowest CORESET ID of the set of configured CORESETs excluding the CORESET-BFR.

11. The non-transitory machine-readable medium of claim 8, wherein when a scheduling offset between the first CORESET and the first PDSCH is less than a threshold, the spatial assumption determined for the first PDSCH is based on a default beam that corresponds to a second CORESET of the set of configured CORESETs, wherein the second CORESET has a lowest CORESET ID of the set of configured CORESETs including the CORESET-BFR.

* * * * *